United States Patent [19]
Prizio

[11] Patent Number: 5,373,863
[45] Date of Patent: Dec. 20, 1994

[54] INVISI-BLIND CAMOUFLAGE DEVICE

[76] Inventor: Ricci Prizio, 41 Bemis Rd., Hubbardston, Mass. 01452

[21] Appl. No.: 997,845

[22] Filed: Dec. 29, 1992

[51] Int. Cl.⁵ .............................................. F04H 15/18
[52] U.S. Cl. ...................................... 135/97; 135/117; 135/901; 359/839; 359/586; 359/478; 160/351
[58] Field of Search ................. 135/97, 112, 116, 117, 135/900, 901, 916; 359/839, 855, 478, 479, 864, 586; 52/239, 241

[56] References Cited
U.S. PATENT DOCUMENTS

| | | | |
|---|---|---|---|
| 1,868,104 | 7/1932 | Hoegger | 359/839 |
| 3,709,237 | 1/1973 | Smith | 135/5 |
| 4,056,309 | 11/1977 | Harbison | 350/310 |
| 4,325,609 | 4/1982 | Alford | 359/839 |
| 4,332,266 | 6/1982 | Wageley | 135/5 |
| 4,336,973 | 6/1982 | Bae | 312/199 |
| 4,473,087 | 9/1984 | Cavender | 135/87 |
| 4,506,467 | 3/1985 | Strung | 43/1 |
| 4,607,401 | 8/1986 | Sisson | 135/97 |
| 4,631,894 | 12/1986 | Jerila | 52/241 |
| 4,695,929 | 9/1987 | Smith | 312/227 |
| 4,773,437 | 9/1988 | Glutting | 135/117 |
| 4,807,093 | 2/1989 | Cisler | 362/74 |
| 4,833,813 | 5/1989 | McLemore, Jr. | 43/1 |
| 4,845,872 | 7/1989 | Anderson | 43/3 |
| 4,902,117 | 2/1990 | Papp | 350/601 |
| 5,007,473 | 4/1991 | Evensen | 52/239 |
| 5,010,909 | 4/1991 | Cleveland | 135/901 |
| 5,054,507 | 10/1991 | Sparks | 135/97 |
| 5,062,234 | 11/1991 | Green | 43/1 |
| 5,122,906 | 6/1992 | Wheatley | 359/586 |

OTHER PUBLICATIONS

Advertisement for "The Stalker Shield" from Bowhunter Magazine (Aug./Sep. 1993).
Advertisement for Mirrorflage, Promotions Unltd.

*Primary Examiner*—Carl D. Friedman
*Assistant Examiner*—Winnie Yip
*Attorney, Agent, or Firm*—Popham Haik Schnobrick & Kaufman, Ltd.

[57] ABSTRACT

The present invention is directed to a portable mirrored camouflage blind that incorporates a plurality of two-way mirrored panels positioned relative to each other side by side along a longitudinal edge, and flexible hinge means for flexibly connecting each of the plurality of two-way mirrored panels with an adjacent two-way mirrored panel whereby the plurality of two-way mirrored panels with the flexible hinge means form an accordion-like structure. Each of the plurality of two-way mirrored panels is optically constructed to produce undistorted reflections of objects located at near and far distances on an outer side of the plurality of two-way mirrored panels.

15 Claims, 7 Drawing Sheets

INVISI-BLIND CAMOUFLAGE DEVICE

BACKGROUND OF THE INVENTION

As in the past, hunters have consistently found themselves in certain types of terrain where there is little or no cover available in which to conceal themselves effectively. In certain wilderness areas and especially during the fall and winter seasons, the trees are not large enough to hang a portable tree stand, and the brush is too thin in which to hide. In such areas, hunters have often been forced to create camouflage barriers using materials from the immediate area. However, this can result in the hunters changing the local landscape. When hunters attempt to do so in areas favored by various animals indigenous to those wilderness areas (i.e., mature whitetails), such changes in the landscape are easily picked out by such wary animals. Thus, a problem exists in how hunters can effectively conceal themselves in any type of cover and blend in so as to be virtually invisible.

There exist today various types of camouflage clothing and portable blinds available on the market today. Among them are the camouflage devices disclosed in U.S. Pat. No. 4,506,467 to Strung, U.S. Pat. No. 4,773,437 to Glutting, U.S. Pat. No. 5,010,909 to Cleveland and U.S. Pat. No. 5,062,234 to Green. These and other types of camouflage are intended to effectively blend the hunter in with different types of cover provided that the camouflage pattern blends in and has the same pattern and colors as the immediate area. However, with devices such as those of Glutting, Cleveland and Green, there is nothing on the market today that effectively works in all types of cover and terrain without changing camouflage patterns. Rather, existing types of camouflage are limited in that they are typically designed to be most effective in only one type of terrain, and only nominally effective in a few others.

With devices such as that of Strung, the mirrored finish of the panels is designed to only reflect objects and colors in the terrain immediately adjacent the panels. The curved shape of those panels results in a distorted reflection of the immediate terrain, while the conical shape of the enclosure causes those distortions to vary in degree along its surface from top to bottom. These optical distortions have been found to scare and/or repulse wildlife from approaching. As a result, devices similar to that of Strung cannot produce true and effective camouflaging reflections of the terrain.

Camouflage devices such as those mentioned above that claim to be versatile and effective in various terrains may often require cumbersome amounts of equipment, and large amounts of time to set up initially. For example, the device of Strung alone requires that several flexible panels be connected to one another using channels on-site in order to form a conical enclosure. An overhead cover having a relatively rigid structure must then be placed on top of the conical enclosure. Even more, these camouflage devices supposedly adaptable to different types of terrain can require inordinate amounts of time to adapt them from one terrain type to another. Devices such as those of Glutting, Cleveland and Green would all require that their camouflage materials be removed from their mountings in order to adapt them from one camouflage pattern to another. Thus, a problem persists in that no camouflage device currently exists that will truly adapt to various types of terrain, while at the same time being easy to use and set up.

Existing types of camouflage devices also severely limit the ability of the hunter or some other user to see beyond the camouflage. Devices such as Glutting, Cleveland and Green only disclose the use of camouflage materials that are opaque, or at best translucent. The device of Strung provides no means for the user to effectively see out of the enclosure without compromising the camouflaging effects of the enclosure.

Some existing devices even require the user to limit his/her movement while using the device in order for it to be effective. Unnecessary or excess movement when using a conventional device may result in the user being seen despite being camouflaged, or at worst in the camouflage device's setup being destroyed. This is most evident in devices such as those of Strung and Cleveland where their enclosures have very restricted amounts of room available. Inherently, these restrictions severely limit the range of activities of the hunter or other users when using the device. Thus, a problem exists in that current camouflage devices strictly limit the freedom of movement of the user. This problem in turn compromises the overall usefulness of the device.

SUMMARY OF THE INVENTION

One object therefore of the present invention is to provide a camouflage device that will truly be versatile in and adaptable to different types of terrain, while at the same time being easy to use and set up. Specifically, the invention is directed to providing a structure that can create undistorted reflections of the terrain, both in the immediate area and at far distances, thereby creating an effective camouflaging environment. In addition, the present invention incorporates a structure that is compact for easy transportation, and that allows both easy setup and breakdown. The present invention's structure dispenses with the need for complex and cumbersome on-site assembly or disassembly.

A second object of the present invention is to provide a camouflage device that incorporates a structure wherein a user can effectively see out beyond the confines of the enclosure without compromising the camouflaging effects of the enclosure.

An even further object of the present invention is to provide a camouflage device that does not severely restrict the vision of the user, or his/her freedom of movement during use.

As will be evident from the description of the present invention that follows, further general objects of the invention include the achievement of a structure that is sturdy and durable for use in adverse weather and terrain conditions, simple in its design and concept, and easy to adjust and maintain during use.

In order to overcome the problems identified above and to achieve the objects of the invention, all as described above, the present invention incorporates various features that create several unique advantages over the devices currently in use. The present invention is directed to a portable mirrored camouflage blind that comprises a plurality of two-way mirrored panels positioned relative to each other side by side along a longitudinal edge, and flexible hinge means for flexibly connecting each of the plurality of two-way mirrored panels with an adjacent two-way mirrored panel whereby the plurality of two-way mirrored panels with the flexible hinge means form an accordion-like structure. Each of the plurality of two-way mirrored panels is optically constructed to produce undistorted reflections of objects located at near and far distances on an outer side of the plurality of two-way mirrored panels.

In a second embodiment of the invention, the portable mirrored camouflage blind incorporates a plurality of two-way mirrored panels positioned relative to each other side by side along a longitudinal edge, and flexible hinge means for flexibly connecting each of the plurality of two-way mirrored panels with an adjacent two-way mirrored panel. The plurality of two-way mirrored panels with the flexible hinge means form an accordion-like structure. Each of the plurality of two-way mirrored panels is formed from a transparent plastic sheet, a mirrored strong polyester film bonded to an outer surface of the transparent sheet, and at least one tinted polyester film bonded to an inner surface of the transparent sheet. In addition, each of the plurality of two-way mirrored panels is optically constructed to produce undistorted reflections of objects located at near and far distances on an outer side of the plurality of two-way mirrored panels.

Among the features achieved by the present invention, solid mirrored panels are used that fold up allowing easy transportation. When the blind is folded it is held closed using closure means, such as complementary hook and loop fastener (Velcro®) strips. The blind creates a solid barrier between the user and the animals. The mirrored panels hide all movement of the user from being observed. The blind can also act as a shield from wind and precipitation. Along with being a wind barrier, the blind can also restrict the scent of the user from being carried to and detected by the animals. Similarly, the blind can help to reduce excess noise from being carried to and heard by the animals.

With regard to the structural features of the invention, the panels are constructed so as to be water and weather resistant. The design of the panels also enables the user to quickly set up the blind in a variety of positions. No complex or time consuming on-site assembly is necessary.

The optics of the panels are designed such that they reflect not only images of the immediate cover but whatever is in front to infinity without distortion. Each panel of the present invention is reinforced so the optics are kept clear enabling the panels to automatically adjust the reflected images to those of the surrounding area without distortion. In tests of the invention, the optics have been found to be so clear in fact that deer and other wildlife have been observed to see their own image and actually move closer; this operates as a visual decoy for the animals. The half-mirrored structure of the panels enables the user to see animals approaching while remaining hidden. Potentially, full dress camouflage clothing may no longer necessary.

In general, the panels of the present invention replaces the need for any other portable blind. It can be made to any length, from a one foot panel to panels connected up to eight feet, or whatever can be carried comfortably. As such, the panels have the potential of being relatively lightweight for transport purposes. Each of the panels of the invention are identical to the others for easy mass production. The panels can also be made break- or impact-resistant. In particular, the blind can be designed to be bulletproof for military purposes while still offering the camouflaging features.

BRIEF DESCRIPTION OF THE DRAWINGS

The advantages of the present invention will become apparent to one of ordinary skill in the art when the following description of the preferred embodiment of the invention is taken in connection with the accompanying drawings where like numerals refer to like or equivalent parts, and in which:

FIG. 12A shows one version of a rolled-up, window shade form of the mirror sheet and a panel frame, FIG. 12B shows a front view of the structure of FIG. 12A fully extended.

DETAILED DESCRIPTION OF THE PREFERRED EMBODIMENTS

Figure 1:
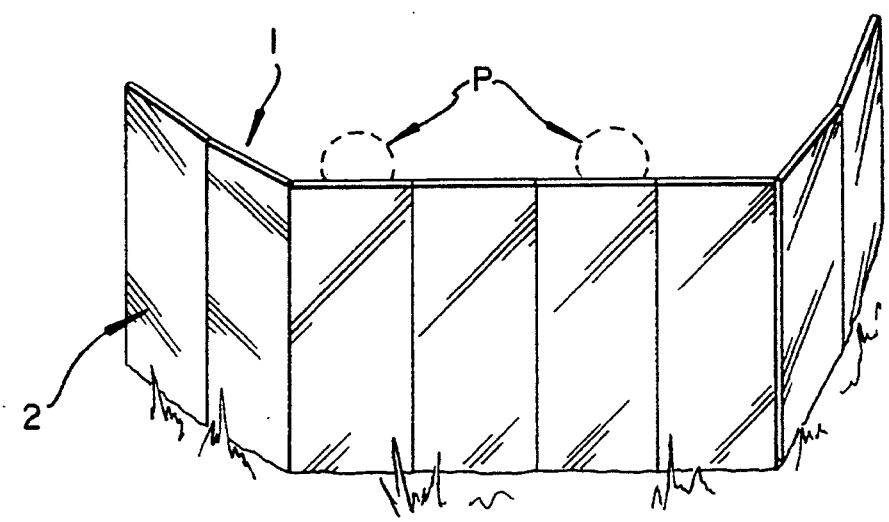
FIG. 1 is an overall perspective view of the present invention in a typical application.
Figure 2A:
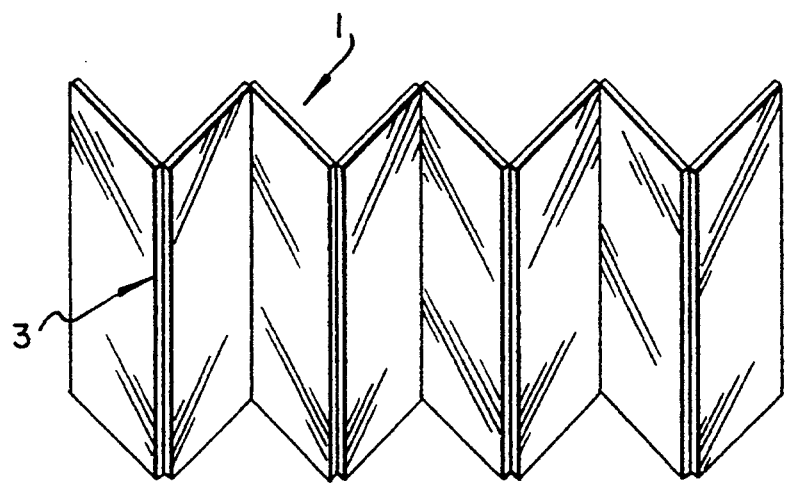
FIGS. 2A and 2B illustrate the accordion-like structure of the present invention and the present invention when folded for transport.
Figure 2B:
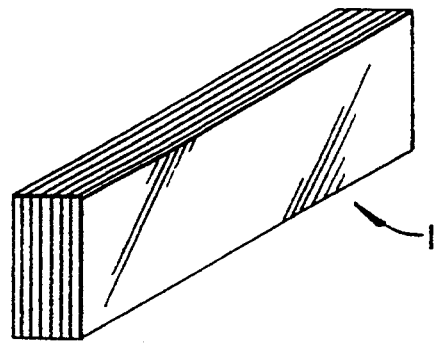

With reference to FIG. 1 the present invention is directed to a portable camouflage blind device 1 that incorporates a plurality of panels 2 that are pivotably joined to each other whereby the panels can be extended and positioned in a manner such as that shown in FIG. 1, or folded in an accordion-like fashion for storage and/or transport as illustrated in FIGS. 2A and 2B.

Figure 3:
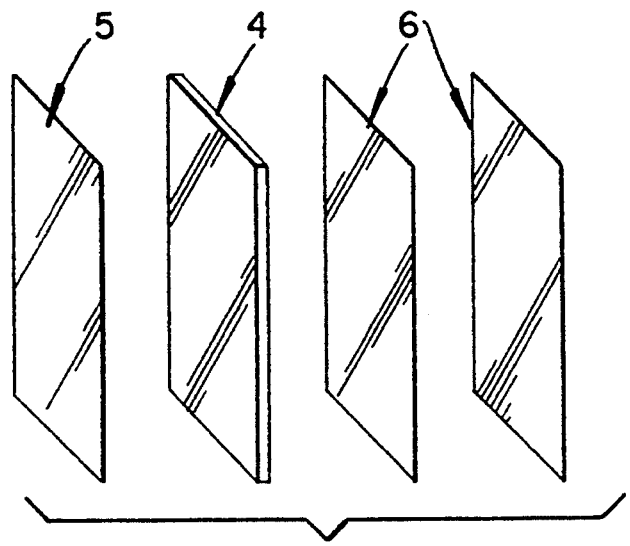
FIG. 3 is an exploded view of the structure of a single panel incorporated in a first embodiment of the present invention.

Each of the panels 2 is constructed so as to embody a mirrored surface whose optics are designed so as to produce an undistorted reflection of objects at both near and far distances. As illustrated in FIG. 3, one embodiment of the invention incorporates a transparent sheet 4 (e.g., acrylic or polycarbonate) with a sufficient thickness so as to be relatively rigid (in this example, a 3/32 in. sheet was used). A first mirrored film 5 is adhesively attached to an outer surface of the sheet 4. In this example, a mirrored film (i.e., a mirrored strong polyester or Mylar ® window tinting) was adhered to the sheet 4 using a soap solution. On the inner surface of the sheet 4, at least one layer of a second mirrored film 6 (in this example, Mylar ®window or limousine tinting) is adhered in order to achieve the desired reflective effect.

Figure 4A:
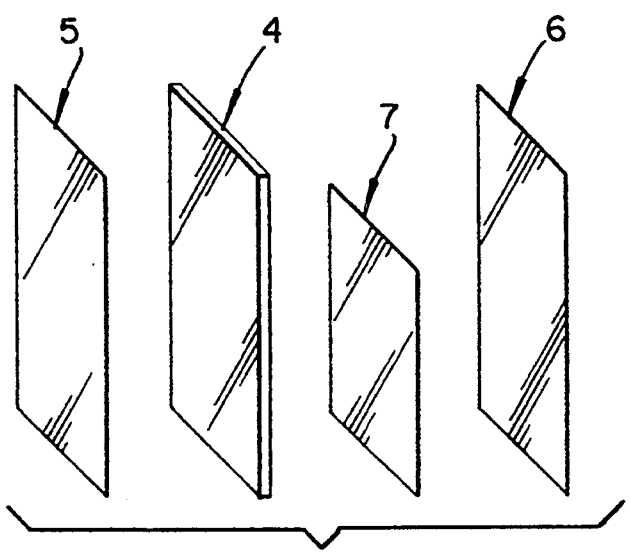
FIGS. 4A and 4B illustrate two variations in the present invention for incorporating a two-way mirror effect in the first embodiment.

In order to provide a two-way mirror effect in some or all of the panels 2 in the blind device 1, at least one mirrored film 7 cut smaller than the other second mirror film(s) 6 (See FIG. 4A). When adhered to the sheet 4, this construction allows a portion of the panel 2 to have a lesser reflective effect than other portions of the panel. This creates the two-way mirror effect that allows a user to see through the panels 2, while remaining relatively unseen from outside of the blind device 1.

Figure 4B:
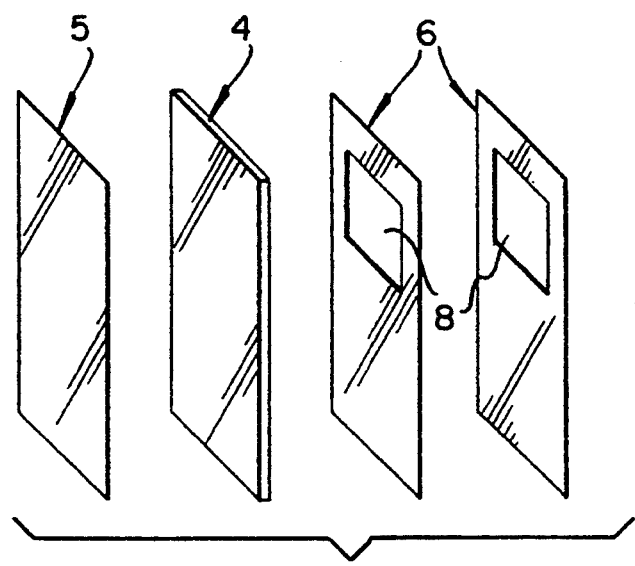

Alternatively, one or each of the second mirrored films 6 can have a window 8 cut out of it (See FIG. 4B). When adhered to the sheet 4, the second mirrored films 6 have their windows 8 aligned with each other, so that the portion of the panel 2 having the window has the two-way mirror effect.

Figure 5:
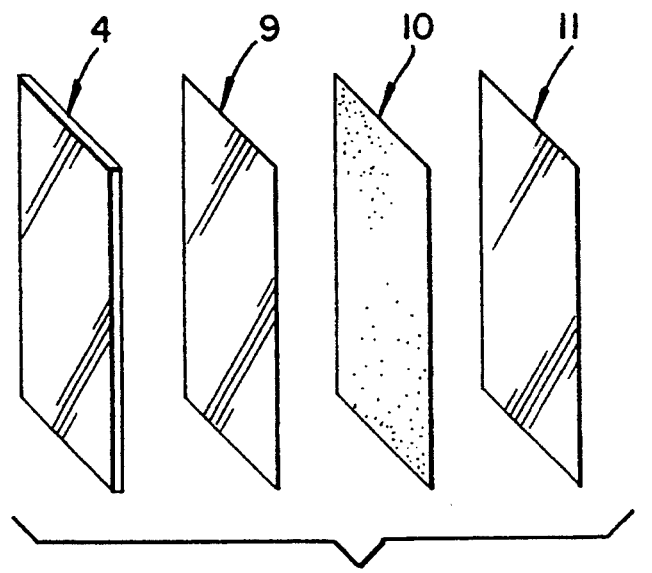
FIG. 5 is an exploded view of the structure of a single panel incorporated in a second embodiment of the present invention.

In a second embodiment of the blind device, the transparent sheet 4 (for example, 3/32 in. acrylic or polycarbonate) has several layers formed on its inner surface. As shown in FIG. 5, the sheet 4 has first reflective material layer 9 (for example, aluminum deposit, liquid silver or other equivalent reflective or silver-like materials) applied thereon. A gray backing layer 10 is then formed on top of the reflective material layer 9. In this example, a gray vinyl or acrylic paint was used. Finally, a transparent outer protective layer 11 is formed on top of the gray backing layer 10. In the example, a clear coat paint was sprayed on the gray paint layer.

To provide some means for seeing through the panels 2, both the reflective material layer 9 and the gray backing layer 10 can be formed with portions of their layer left off so as to define windows 12 thereon in some or all the panels 2 in the blind device 1.

Figure 6A:
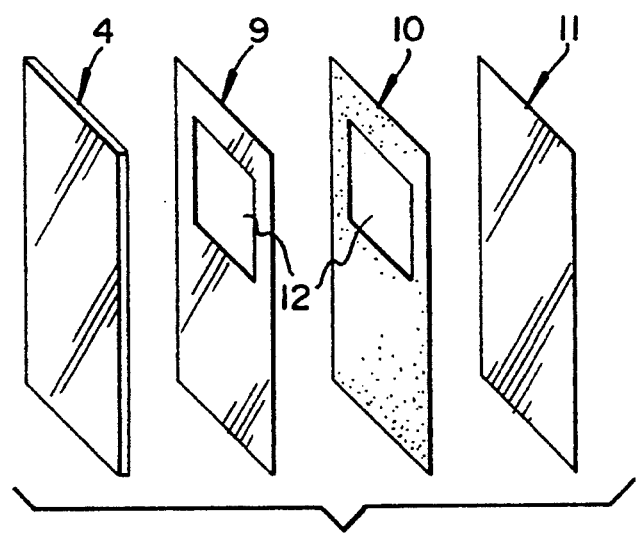
FIGS. 6A and 6B illustrate two variations in the present invention for incorporating a window in the second embodiment.
Figure 6B:
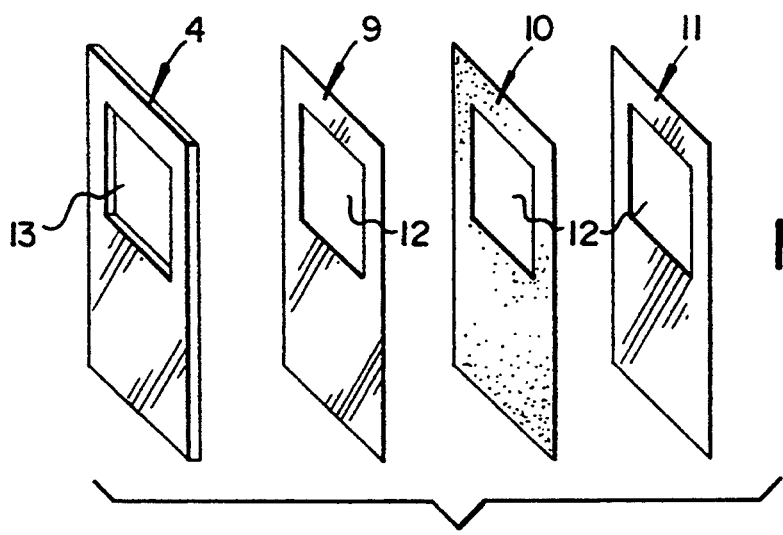

Alternatively, as shown in FIG. 6B, the sheet 4 can be formed with a slot or window hole 13 already defined therein. Concurrently, each of the other layers would thus have a corresponding portion of their total surface areas left off. In addition, the window hole 13 can be used not only for viewing from behind the blind device 1, but also serve as a carrying handle when the blind device 1 is folded for transport.

Figure 7:
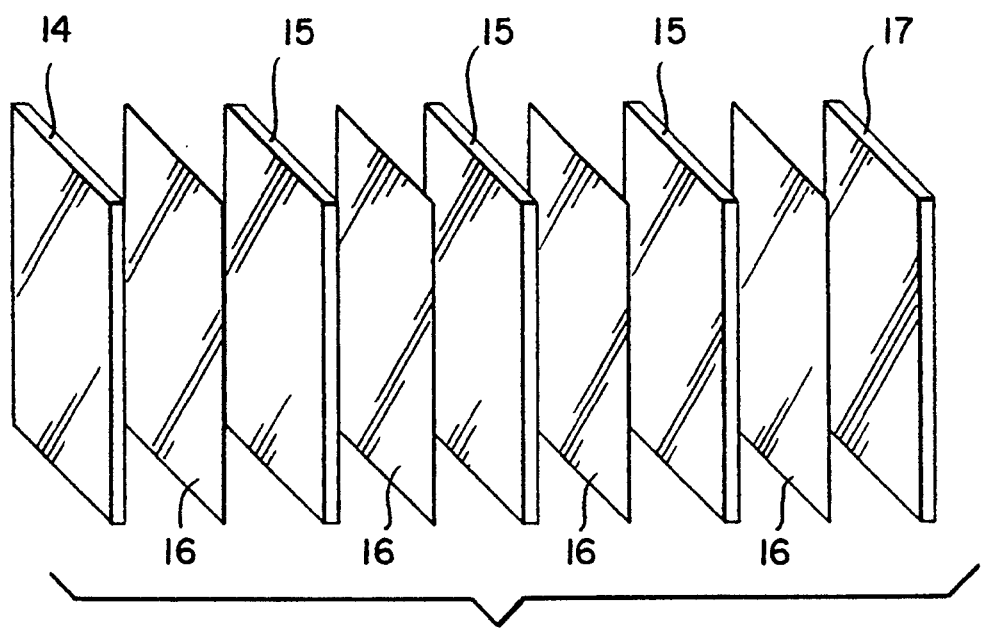
FIG. 7 is an exploded view of a third embodiment of the present invention incorporating an impact-resistant structure (i.e., bulletproof)

In a third embodiment of the blind device 1 shown in FIG. 7, each of the panels 2 incorporates a plurality of layers combined together so as to form an impact-resistant (i.e., bullet-proof) structure. Each panel 2 combines a first mirrored panel 14 formed in a manner similar to the mirrored panels discussed above with three thick transparent sheets 15 (i.e., ¼ in. acrylic or polycarbonate, or the equivalent in glass) stacked on an inner side of the first mirrored panel 14, a transparent protective sheet 17 (i.e., 3/32 in. acrylic or polycarbonate, or the equivalent in glass) adhered to the outermost thick transparent sheet 15 with a plurality of thin transparent sheets between the mirrored panel 14, thick transparent sheets 15 and protective sheet 17. The thin transparent sheets 16 are used to bond the other layers of the impact-resistant panel together. In this example, transparent vinyl sheets each 0.015 in. thick were used.

In any of the above-described embodiments of the blind device 1, when the panels 2 are made from acrylic, polycarbonate or some other equivalent material, the use of such materials may render the panels 2 somewhat flexible. This would vary depending upon the thickness of the panels 2 or their layers, or on the type of material used for the panels 2. In order to maintain the optics of the mirrored panels 2 as well as to keep them rigid, each of the panels may require reinforcement.

Figures 8A, 8B:
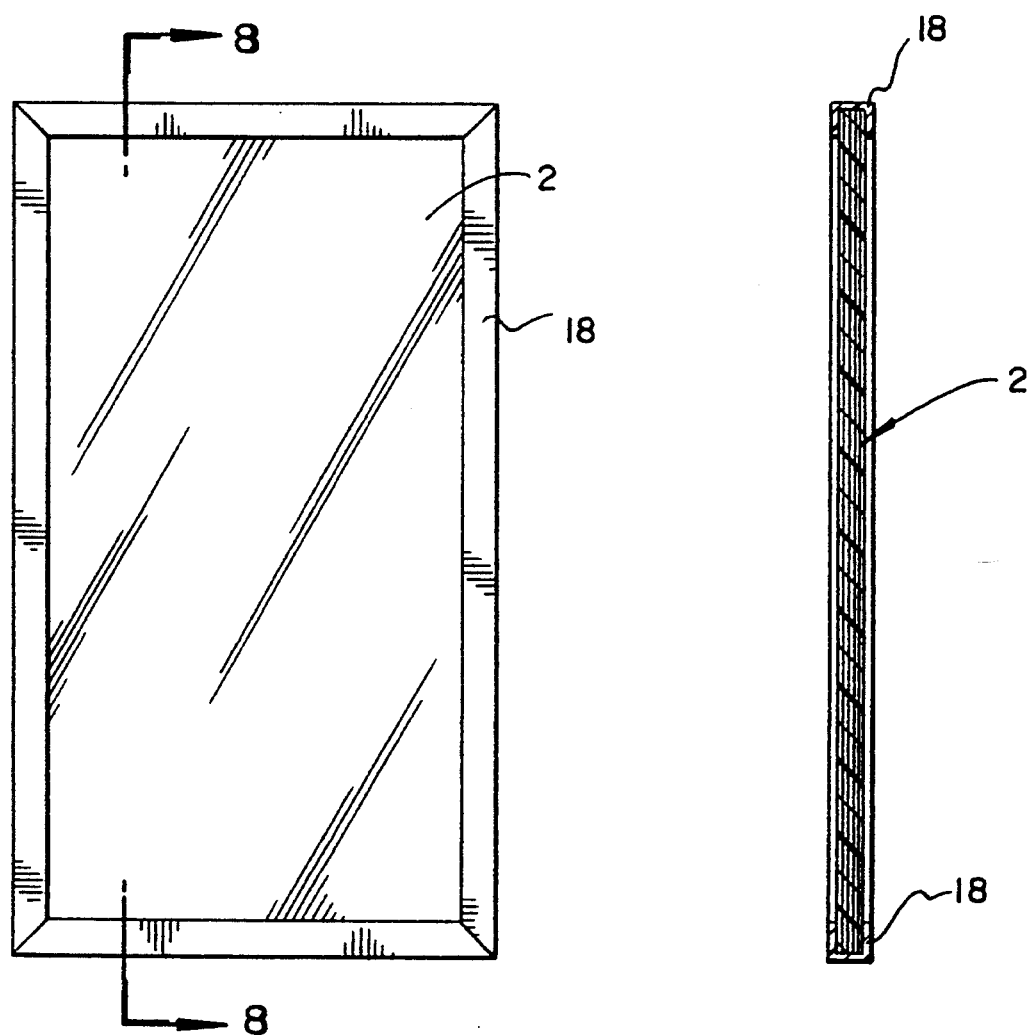
FIGS. 8A and 8B are an overall view and cross-sectional view of a single panel incorporating a U-shaped channel frame.

One embodiment for reinforcing each of the panels 2 is illustrated in FIGS. 8A and 8B. As shown, U-shaped channels are bonded to the outer periphery of each panel. The U-shaped channels can be formed from anodized aluminum or other similarly rigid material. In order to preserve the camouflaging effect of the panels, the U-shaped channels can be covered or painted, among others, to be dark or have a camouflage pattern.

Figure 9A:
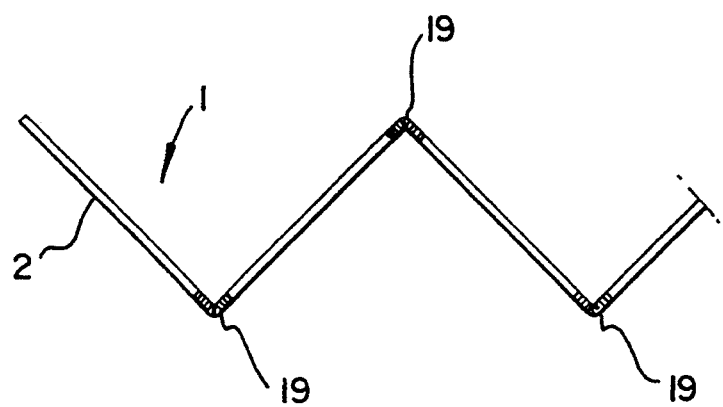
FIGS. 9A through 9C illustrate one embodiment for flexibly hinging the panels together in the present invention.
Figure 9B:
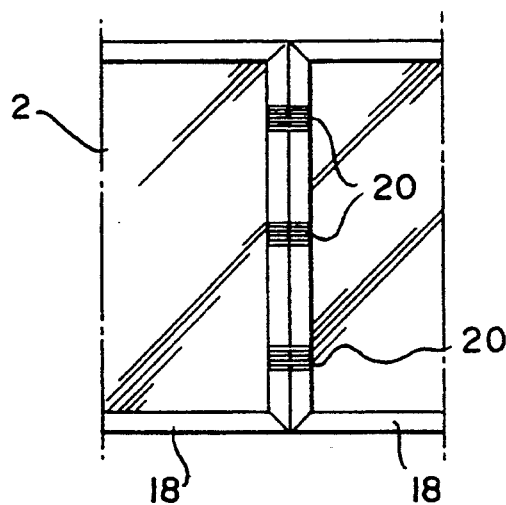
Figure 9C:
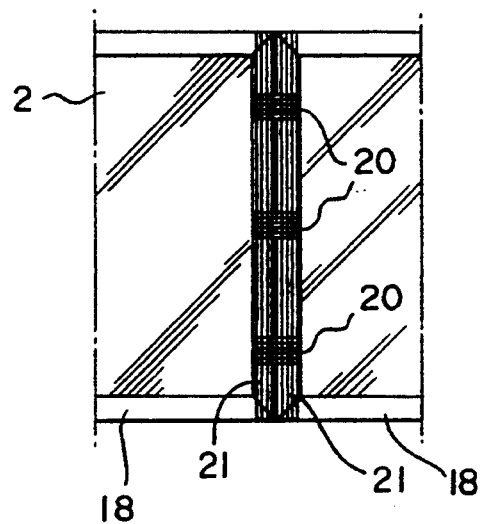

In order for the blind device 1 to fold and extend in an accordion-like manner, a flexible hinge system must be incorporated between adjacent panels. Such a flexible hinge system must be both durable and weather-resistant in order to be useful in various types of terrain and conditions. In addition, such a hinge system should also be adaptable or removable so as to allow the removal and replacement of damaged panels. One type of flexible hinge system that can be used as an example consists of reinforced packing tape (See FIGS. 9A through 9C).

As shown, the flexible hinges 19 consists essentially of packing tape hinging strips 20 that are applied across adjacent U-shaped channels 18 alternating between the outer and inner sides of the panels 2 for extra strength in the hinging. Second, the adjacent panels 2 are wrapped top to bottom along the adjacent U-shaped channels with packing tape covering strips 21. The top-to-bottom covering strips 21 of packing tape also alternate between the outer and inner sides of pairs of adjacent panels 2. This example of an alternating structure helps create the accordion-like effect (See FIG. 9A). However, other similar or equivalent structures can be used that may be more durable, versatile and modular (i.e., metal hinges, Velcro ®).

Figure 10:
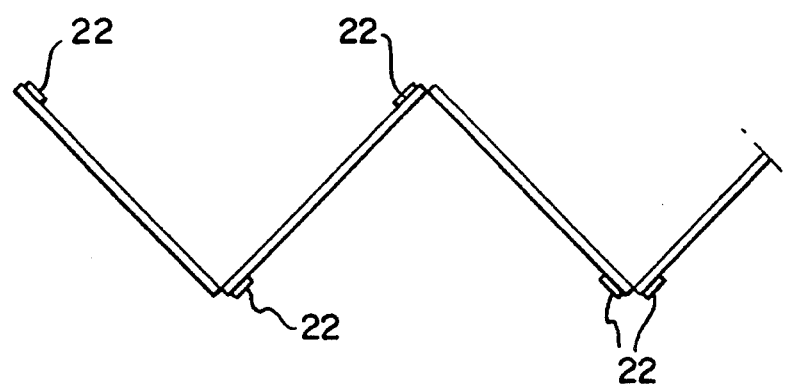
FIG. 10 illustrates one embodiment incorporating means for securing the present invention in the folded position for transport.

When the blind device 1 is folded for transport or storage, a system for securing the device in the folded state may be incorporated. One such system shown in FIG. 10 incorporates Velcro ® fasteners 22 positioned so as to place their opposing elements on the sides of the adjacent panels 2 that face each other. Here also, other equivalent systems may be used (i.e., latches, hooks, magnets).

Figure 11:
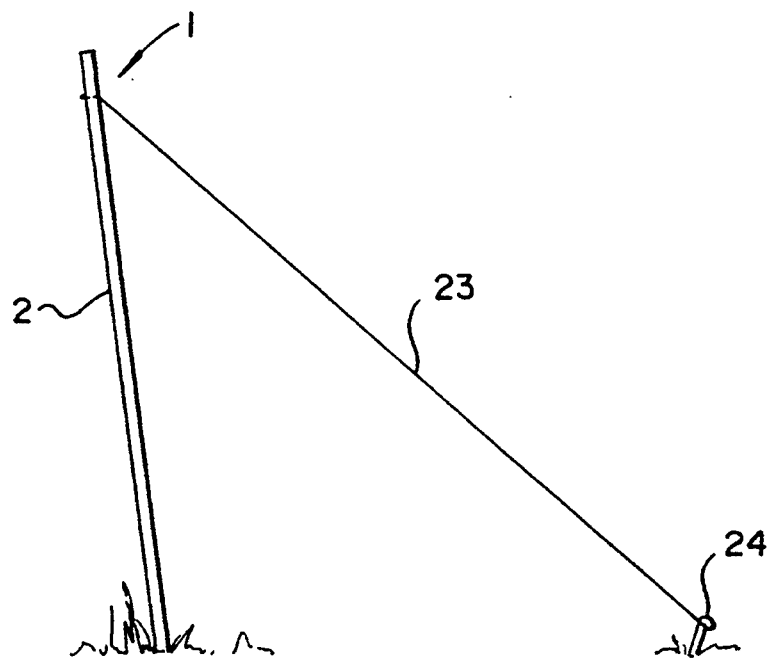
FIG. 11 illustrates one embodiment for securing the present invention in an upright position against wind, precipitation and hilly terrain during use.

As discussed earlier, the blind device 1 is intended for use in various types of terrain and conditions. However, hilly areas and adverse winds or precipitation may make the standing of the blind device 1 difficult to maintain. One type of system that may be incorporated into the blind device consists of at least one support line 23 (See FIG. 11) connected at one end to at least one of the panels 2 with its other end held down in place with a stake 24 in the ground. Like the other earlier-discussed features, other systems equivalent to the support line held by a stake may be used.

As evident from the above-discussion, there are numerous variations possible in the invention that do not depart from the intended scope of the invention. Among those variations, the use of peephole lenses or wide angle micro lenses offers even less obtrusive and visible techniques for viewing the surrounding wildlife. The slots or windows 13 cut into the top of the panels to provide viewing can also be used as handles for easier carrying.

Note that if the panels 2 are very tall, then the slot or window handles for people of normal height may cause the panel bottoms to drag. A second set of slots or openings can be located at the bottom of the panels so that two people can carry the panels. In addition, the slots or windows would have to be reinforced with a frame if the mirror sheet is under tension, without a rigid plastic backing to also provide strength for the slots or openings. If the slots or openings are located next to the supporting frame, then the frame top and bottom can be used to provide the strength for the carrying slots or windows.

In another variation, both sides of the panels 2 can be provided with reflecting surfaces so that the panels 2 are camouflaged from both sides. The second side can also function as a spare mirror in case the outside mirror is damaged. Also, the mirror sheets can be mounted on a nylon or metal mesh to provide strength and protection against ripping while also providing viewing through the two-way mirror portions or viewing openings.

With the impact-resistant embodiment of the blind device 1, additional protection can be provided by means of bullet proof layers such as, but not limited to, Kevlar ® layers. Two or more layers thereof with foam layers between can be added to the panels 2, and optionally can be located only at the panels that will be used for viewing.

With the mirror structure of the blind device 1, a second surface mirror can be used for protection against corrosion and scratching. A first surface mirror has reflecting material on the outside of the mirror. The second surface mirror is on the back of the transparent supporting structure, and is thus protected against degradation.

Figure 12A:
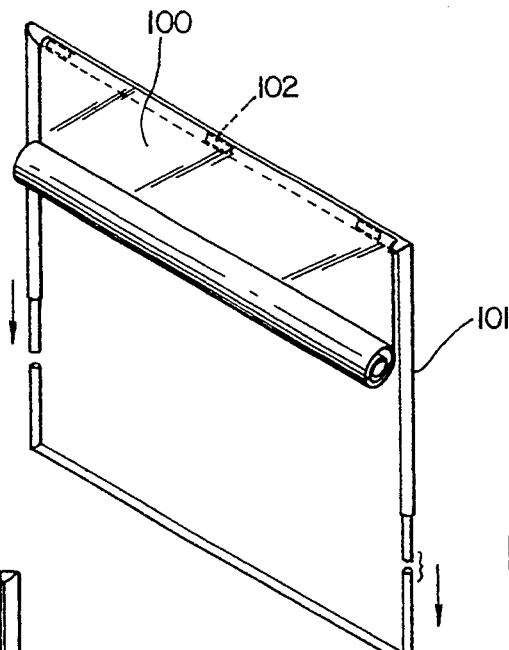
FIGS. 12A through 12B illustrate a telescoping frame design embodiment of the present invention where
Figure 12B:
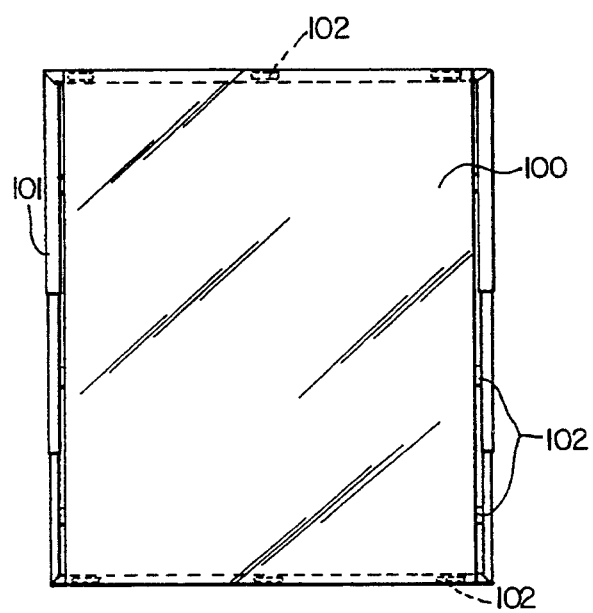

One variation of the whole blind device itself involves the use of a telescoping frame design (See FIGS. 12A–12B), with mirror sheets 100 in window shade form which allows the blind device to be carried more easily. If the mirrors are on flexible plastic sheets 100, then they can be carried in a rolled-up form like a window shade, and in one example attached to the top or bottom of the panel frame 101 as illustrated in FIG. 12A, and can be deployed by pulling the mirror shade out to be attached to the other end of the frame as shown in FIG. 12B. In one embodiment of this structure, the mirror sheets 100 can be constructed by adhering the tinted polyester film directly onto the mirrored strong polyester film (both flexible and made of Mylar ®, for example). Fastening means 102 (i.e., Velcro ® strips, buttons, snaps, toggles, buttons, strings or combinations thereof) on the sides of the unrolled sheets 100 can be used to attach the edges to the frame 101 to reduce the rippling of the sheet 100 caused by the wind.

In addition, the frame 101 can be made of telescoping tubular form that can be extended before the window shade-type mirrors 100 are extended. The tubular telescoping frame 101 can be locked into its extended position by means of spring loaded fingers that extend through the outer tubing when properly extended. Depressing a spring-loaded mechanism would permit the tubular frame 101 to retract for convenient carrying. Alternatively, pins can be inserted through the telescoping frame 101 to temporarily prevent collapse.

Figure 13:
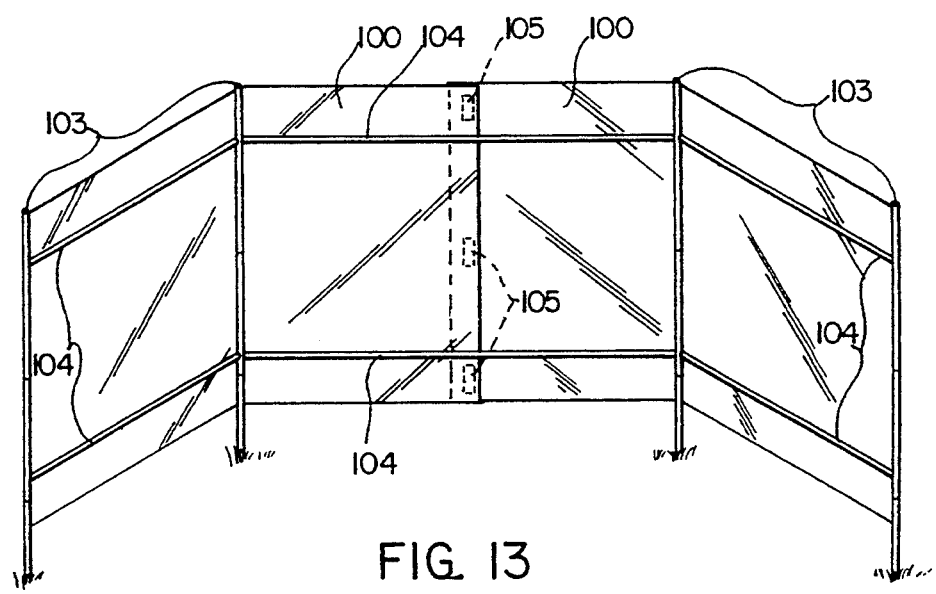
FIG. 13 illustrates another telescoping frame design embodiment wherein the mirror sheets(s) are stretched around an array of posts inserted into the ground.

If the mirrors are formed on flexible plastic sheets 100, alternatively, they can be stretched around an array of posts 103 inserted into the ground (See FIG. 13). These posts 103 can be used to augment the trees that are available. The posts 103 can be made of telescoping aluminum or plastic and can include side struts 104 that will aid the posts in resisting inward pulls exerted by the stretched mirror sheets 100. These mirror sheets 100 can be increased in length by attaching sections by various means 105 including, but not limited to Velcro ®, zippers, snaps, buttons, or strings. The mirror sheets 100 can have viewing openings or windows (not shown) that include but are not limited to slots, slots with two-way mirror coverings, lenses and wide angle lenses. In addition, there can be openings to permit the use of cameras, guns, or arrows.

The foregoing discussion is considered as illustrative only of the principles of the invention. Further, since numerous modifications and changes (such as those discussed above) will readily occur to those skilled in the art, it is not desired to limit the invention to the exact construction and operation shown and described. Accordingly, all suitable modifications and equivalents may be resorted to, falling within the scope of the invention.

I claim:

1. A portable mirrored camouflage blind, comprising:
 a plurality of two-way mirrored panels positioned relative to each other side by side along a longitudinal edge; and
 flexible hinge means for flexibly connecting each of said plurality of two-way mirrored panels with an adjacent two-way mirrored panel wherein said plurality of two-way mirrored panels with said flexible hinge means form an accordion-like structure,
 wherein each of said plurality of two-way mirrored panels is optically constructed to produce undistorted reflections of objects located at near and far distances on an outer side of said plurality of two-way mirrored panels, and
 wherein each of said plurality of two-way mirrored panels further includes
 at least one impact-resistant plastic layer bonded to an inner surface of a two-way mirrored panel, a transparent plastic surface panel bonded to the at least one impact-resistant plastic layer so as to be an innermost side layer of the two-way mirrored panel, and
 a plurality of transparent bonding layers between the inner surface of the two-way mirrored panel, the at least one impact-resistant plastic layer and the transparent plastic surface panel so as to laminately bond the inner surface of the two-way mirrored panel to the at least one impact-resistant resistant plastic layer and the at least one impact-resistant plastic layer to the transparent plastic surface panel.

2. A portable mirrored camouflage blind according to claim 1, wherein each of said plurality of two-way mirrored panels includes a transparent plastic sheet, a reflective mirror layer deposited on an inner surface of the plastic sheet, a grey cover layer deposited on the reflective mirror layer, and a transparent protective layer deposited on the grey cover layer.

3. A portable mirrored camouflage blind according to claim 1, wherein each of said plurality of two-way mirrored panels has defined therethrough a window hole.

4. A portable mirrored camouflage blind according to claim 2, wherein each of the reflective mirror layer and grey cover layer has defined therethrough a window, the windows being positionally aligned with each other in at least one of said plurality of two-way mirrored panels.

5. A portable mirrored camouflage blind according to claim 2, wherein the transparent plastic sheet is formed from at least one of the materials from the group consisting of acrylic and polycarbonate.

6. A portable mirrored camouflage blind according to claim 1, wherein the at least one impact-resistant plastic layer is formed from at least one of materials from a group consisting of acrylic and polycarbonate.

7. A portable mirrored camouflage blind according to claim 1, wherein the transparent plastic surface layer is formed from at least one of materials from a group consisting of acrylic and polycarbonate.

8. A portable mirrored camouflage blind according to claim 1, wherein each of said plurality of two-way mirrored panels further includes three impact-resistant plastic layers bonded to an inner surface of the two-way mirrored panel.

9. A portable mirrored camouflage blind according to claim 1, wherein each of said plurality of transparent bonding layers is formed from transparent vinyl.

10. A portable mirrored camouflage blind as claimed in claim 1, further comprising:
a reinforcing frame formed along outer peripheral edges of each of said plurality of two-way mirrored panels so as to maintain each of said two-way mirrored panels substantially flat, said reinforcing frame being formed from U-shaped channels adhesively bonded to the outer peripheral edges.

11. A portable mirrored camouflage blind as claimed in claim 10, wherein said reinforcing frame is formed from aluminum.

12. A portable mirrored camouflage blind as claimed in claim 1, wherein each of said plurality of two-way mirrored panels is formed rigidly flat.

13. A portable mirrored camouflage blind as claimed in claim 1, wherein each of said plurality of two-way mirrored panels is formed from a transparent plastic sheet, a mirrored film bonded to an outer surface of the transparent sheet, and at least one tinted polyester film bonded to an inner surface of the transparent sheet.

14. A portable mirrored camouflage blind as claimed in claim 13, wherein the mirrored film bonded to the outer surface of the transparent sheet is formed from a strong polyester film.

15. A portable mirrored camouflage blind as claimed in claim 13, wherein the at least one tinted film bonded to the inner surface of the transparent sheet is formed from a polyester film.

* * * * *